(12) United States Patent
Hall et al.

(10) Patent No.: US 12,688,813 B2
(45) Date of Patent: Jul. 21, 2026

(54) TECHNIQUES FOR DISPLAY COLOR CORRECTION

(71) Applicant: Universal City Studios LLC, Universal City, CA (US)

(72) Inventors: Gregory Shellman Hall, Orlando, FL (US); Robert Roy Kipping, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 60 days.

(21) Appl. No.: 18/630,560

(22) Filed: Apr. 9, 2024

(65) Prior Publication Data

US 2025/0259587 A1 Aug. 14, 2025

Related U.S. Application Data

(60) Provisional application No. 63/551,645, filed on Feb. 9, 2024.

(51) Int. Cl.
*A63G 31/00* (2006.01)
*G06F 1/16* (2006.01)
(Continued)

(52) U.S. Cl.
CPC ......... *G09G 3/2092* (2013.01); *G06F 1/1605* (2013.01); *A63G 7/00* (2013.01); (Continued)

(58) Field of Classification Search
CPC .......... A63F 13/213; G02B 5/32; G09G 3/00; G09G 3/20; G09G 3/2092; G09G 3/3233; (Continued)

(56) References Cited

U.S. PATENT DOCUMENTS

| | | | |
|---|---|---|---|
| 6,462,769 | B1 | 10/2002 | Trowbridge et al. |
| 9,996,977 | B2 | 6/2018 | O'Connor et al. |

(Continued)

FOREIGN PATENT DOCUMENTS

| | | |
|---|---|---|
| CN | 103888742 A | 6/2014 |
| CN | 112309317 A | 2/2021 |

OTHER PUBLICATIONS

"Guardians of the Galaxy—Mission: Breakout!," https://en.wikipedia. org/w/index.php?title=Guardians_of_the_Galaxy_-_Mission:_ Breakout!&oldid=1124065652 last edited on Nov. 27, 2022, 9 Pages.

(Continued)

*Primary Examiner* — Chanh D Nguyen
*Assistant Examiner* — Nguyen H Truong
(74) *Attorney, Agent, or Firm* — Fletcher Yoder, P.C.

(57) ABSTRACT

A display correction system including a display and a control system including processing circuitry and a memory, the memory storing instructions that, when executed by the processing circuitry, are configured to cause the processing circuitry to determine a first guest configuration in a ride vehicle during a first ride cycle, and determine a first view point based on the first guest configuration. The instructions are also configured to cause the processing circuitry to generate a first color correction layer based on the first view point and apply the first color correction layer to the display.

20 Claims, 4 Drawing Sheets

(51) Int. Cl.
| | |
|---|---|
| *G09G 3/20* | (2006.01) |
| *G09G 3/3233* | (2016.01) |
| *A63G 7/00* | (2006.01) |
| *A63G 31/16* | (2006.01) |

(52) U.S. Cl.
CPC ..... *A63G 31/16* (2013.01); *G09G 2320/0242* (2013.01); *G09G 2320/028* (2013.01); *G09G 2354/00* (2013.01)

(58) Field of Classification Search
CPC .. G09G 5/00; G09G 5/06; G09G 5/10; G09G 2320/0242; G09G 2320/028; G09G 2354/00; H04N 5/232; H04N 7/18; H04N 13/00; H04N 13/04; H04N 13/30; H04N 13/69; H04N 13/337; H04N 13/366; H04N 13/322; H04N 13/133; H04N 13/324; H04N 21/458; H04N 21/4402; G02F 1/13; G02F 1/139; G02F 1/1335; G02F 1/13357; G02F 1/1334; G02F 1/1333; G09F 9/33; G06T 7/73; G06T 7/80; G06T 7/246; G06T 7/292; G06T 11/60; G06T 19/00; B60K 35/00; G06Q 30/02; A63B 67/00; G05B 15/02; A61B 1/00; G06F 1/16; G06F 1/1605; G06F 3/01; G06F 3/14; G06F 3/04842; G06F 3/04845; G06F 3/04817; G06F 3/04815; G06F 3/04883; G06F 17/30; G06F 40/58; A63G 1/10; A63G 1/34; A63G 7/00; A63G 21/00; A63G 21/18; A63G 31/00; A63G 31/02; A63G 31/16; A63J 1/02; A63J 5/02; G06V 10/20; G06V 10/764; G06V 40/20; G06K 9/00; G06N 20/00
See application file for complete search history.

(56) References Cited

U.S. PATENT DOCUMENTS

| | | | |
|---|---|---|---|
| 10,369,483 | B1 | 8/2019 | Hall et al. |
| 10,976,980 | B2 | 4/2021 | Chang |
| 11,061,181 | B2 | 7/2021 | Robinson et al. |
| 2010/0238101 | A1* | 9/2010 | Jhuo .................... G09G 3/2003 |
| | | | 345/88 |
| 2014/0146069 | A1* | 5/2014 | Tan ...................... G06F 3/04845 |
| | | | 345/589 |
| 2015/0352452 | A1* | 12/2015 | Vance ...................... A63G 7/00 |
| | | | 472/59 |
| 2016/0202758 | A1* | 7/2016 | Peana ...................... G06F 3/013 |
| | | | 345/601 |
| 2016/0358225 | A1* | 12/2016 | Zhang ................. G06F 16/5838 |
| 2021/0042957 | A1* | 2/2021 | Lin ...................... G06V 40/161 |
| 2022/0014728 | A1 | 1/2022 | Deighton |
| 2023/0005402 | A1* | 1/2023 | Peng ...................... G06F 3/013 |
| 2025/0104579 | A1* | 3/2025 | Aogaki ................. G09G 3/001 |

OTHER PUBLICATIONS

PCT/US2025/013346 Invite to Pay Additional Fees mailed Apr. 1, 2025.
PCT/US2025/013346 International Search Report and Written Opinion mailed May 26, 2025.

* cited by examiner

50

DETERMINE A GUEST CONFIGURATION
IN A RIDE VEHICLE

52

DETERMINE A CENTRAL VIEW POINT
BASED ON THE GUEST CONFIGURATION

54

GENERATE A COLOR CORRECTION LAYER
BASED ON THE CENTRAL VIEWPOINT

56

DETERMINE A POSITION OF THE RIDE
VEHICLE

58

APPLY THE COLOR CORRECTION LAYER
BASED ON THE POSITION

60

TECHNIQUES FOR DISPLAY COLOR CORRECTION

CROSS-REFERENCE TO RELATED APPLICATION

This application claims priority to and the benefit of U.S. Provisional Application No. 63/551,645, entitled "TECHNIQUES FOR DISPLAY COLOR CORRECTION" and filed Feb. 9, 2024, which is incorporated by reference herein in its entirety for all purposes.

BACKGROUND

The present disclosure generally relates to a display correction system that generates a color correction layer for a display.

A venue, such as an amusement park, may include a variety of attractions. Some attractions may include displays (e.g., light-emitting diode (LED) panels, monitors, digital screens, and/or other displays) to provide images for visualization by guests in the attractions. It is presently recognized that the displays may exhibit changes in color balance, with some colors becoming more dominant or faded compared to others. With increasing sophistication and complexity of modern ride attractions, it may be desirable to provide improved systems to reduce changes in the color balance to improve experiences for the guests in the attractions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a display correction system includes a display and a control system. The control system includes processing circuitry and a memory, the memory storing instructions that, when executed by the processing circuitry, are configured to cause the processing circuitry to determine a first guest configuration in a ride vehicle during a first ride cycle, and determine a first view point based on the first guest configuration. The instructions are also configured to cause the processing circuitry to generate a first color correction layer based on the first view point and apply the first color correction layer to the display.

In an embodiment, a method of operating a display correction system includes determining, via a processing system, a plurality of guest configurations of a ride vehicle during a plurality of ride cycles. The method also includes determining, via the processing system, a plurality of view points based on the plurality of guest configurations. The method further includes generating, via the processing system, a plurality of color correction layers. A respective color correction layer of the plurality of color correction layers corresponds to a respective view point of the plurality of view points.

In an embodiment, a display correction system includes a display and a control system. The display correction system includes processing circuitry and a memory. The memory stores instructions that, when executed by the processing circuitry, are configured to cause the processing circuitry to determine a guest configuration in a guest area, determine a view point based on the guest configuration, and instruct movement of the display relative to the guest area via one or more movement mechanisms. The instructions are also configured to generate a color correction layer based on the view point and the movement of the display and apply the color correction layer to the display.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
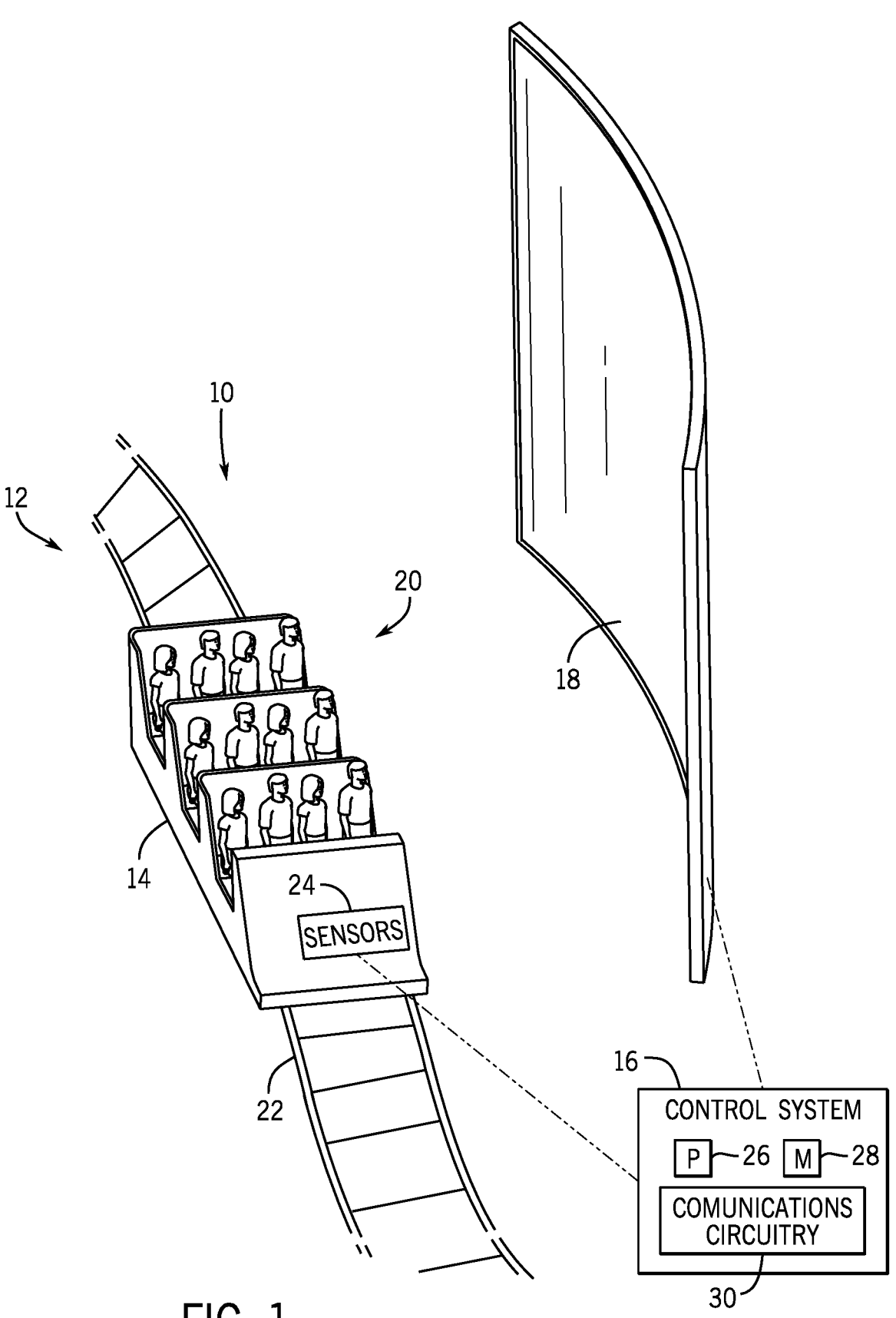
FIG. 1 is a perspective view of an attraction that includes a display correction system with a ride vehicle including a first guest configuration, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The systems and methods disclosed herein relate generally to a display correction system (e.g., a display color correction system) that generates a color correction layer to apply to a display. In particular, the display correction system may apply the color correction layer to the display to adjust and/or correct a change in color balance (e.g., color drift) of the display. In an embodiment, the display correction system may determine (e.g., identify) a guest configuration (e.g., guest distribution, guest arrangement) for a ride vehicle. The guest configuration may include a number of guests and/or a location (e.g., a position) of each guest of the number of guests seated in the ride vehicle. For example, the guest configuration may be determined based on sensor data received from a number of sensors.

In such cases, the display correction system may determine a central view point (e.g., an average view point, a selected view point, a combined view point) for the ride vehicle based on the guest configuration. Indeed, the central view point may be based on the number of guests, the individual locations of the number of guests, and/or each view point of the number of guests from their respective seat in the ride vehicle. For example, the display correction system may average (or approximate) a visual perspective or sightline of each guest of the number of guests based on a height of each guest of the number of guests to determine the central view point. As another example, the display correction system may approximate a view point from a center of the number of guests. That is, if the ride vehicle includes three rows of guests, with each seat of the three rows occupied by the guests, then the display correction system may determine the central view point to be from a second row (e.g., in between a first row and a third row) of the ride vehicle.

In an embodiment, the display correction system may determine a standard central view point for the ride vehicle based on the ride vehicle at full occupancy (e.g., each seat is filled by a respective guest). For example, the standard central view point may be based on an average height of each guest of the guests in the ride vehicle when the ride vehicle is at full occupancy. In an embodiment, the display color correction system may determine multiple adjusted central view points for the ride vehicle based on determining different guest configurations in the ride vehicle during different ride cycles.

The display correction system may generate a color correction layer (e.g., color pixel compensation) based on the central view point. The color correction layer may enable adjustment of an intensity (e.g., a color value) of a color channel (e.g., red, green, blue (RGB) channel) for a number of pixels of the display when applied to the display. The intensity of the color channel for each pixel may determine an overall color of the pixel. The display correction system may then determine a position (e.g., location, orientation) of the ride vehicle in the ride cycle. For example, the display correction system may determine the position of the ride vehicle as a position during the ride cycle where the guests may perceive color imbalance on the display. Thus, the display correction system may apply the color correction layer to the display to adjust the intensity of the color channel and/or compensate for the color drift. Moreover, the display correction system may store the color correction layer for use during a subsequent ride cycle that includes a same or similar guest configuration and/or a same or similar central view point.

As an example, while observing the display, the guests may visually perceive a first portion of the display having a heightened intensity of a red tone. That is, the first portion of the display may appear more red in comparison to a second portion of the display. Therefore, the display correction system may generate the color correction layer that enables adjustment (e.g., increase or decrease) of a red channel for each pixel in the first portion of the display. Indeed, if each pixel in the first portion of the display has a red value of 180, then the color correction layer may enable adjustment of the red value to 130 when applied to the display. Thus, the display correction system may apply the color correction layer to the display, causing the red value of the first portion of the display to adjust from the red value of 180 to the red value of 130 during a ride cycle. As such, the display may visually appear more balanced, with the first portion of the display appearing less red and more integrated with an overall color scheme of the display. Indeed, images displayed to the guests may appear to include an even or consistent color appearance across the display. In an embodiment, the display correction system may adjust the color correction layers based on parameters of the ride vehicle. For example, the parameters of the ride vehicle may include a speed, an orientation relative to the display, a size (e.g., length, width, height), an acceleration, and so on.

In an embodiment, the ride vehicle may include different guest configurations in different ride cycles. That is, the number of guests and/or the location of the guests in the ride vehicle may vary for the different ride cycles. Therefore, the display correction system may generate additional color correction layers, which may each be based on a respective guest configuration and/or a respective central view point. Additionally, the display correction system may store the additional color correction layers with corresponding guest configurations and/or corresponding central view points. In this manner, the display correction system may efficiently retrieve the previously stored color correction layer after determining the corresponding guest configuration and/or the corresponding central view point during a respective ride cycle.

As an example, during a first ride cycle, the display correction system may receive sensor data indicative of a first guest configuration. In the first guest configuration, the ride vehicle may include three rows, where each seat of the three rows includes a seated guest. The display correction system may determine a first central view point based on the first guest configuration. Moreover, the display correction system may generate a first color correction layer based on the first central view point and determine a first position of the ride vehicle. The display correction system may then apply the first color correction layer based on the first position during the first ride cycle and store the first color correction layer.

During a second ride cycle, the display correction system may receive the sensor data indicative of a second guest configuration. In the second guest configuration, the ride vehicle may include the three rows, where each seat of a first row and a second row of the three rows includes a seated guest and each seat of a third row of the three rows does not include a seated guest. The display correction system may determine a second central view point based on the second guest configuration and generate a second color correction layer. Moreover, the display correction system may determine a second position of the ride vehicle and apply the second color correction layer to the display based on the second position during the second ride cycle. The display correction system may then store the second color correction layer.

As such, if the display correction system determines the first guest configuration in the ride vehicle in a subsequent ride cycle, the display correction system may efficiently retrieve the first color correction layer to apply to the display. Similarly, if the display correction system determines the second guest configuration in the ride vehicle in the subsequent ride cycle, the display correction system may efficiently retrieve the second color correction layer to apply to the display.

With the foregoing in mind, FIG. 1 is a perspective view of an attraction 10 that includes a display correction system 12 with a ride vehicle 14 including a first guest configuration (e.g., full occupancy), in accordance with an embodiment of the present disclosure. The ride vehicle 14, a control system 16, and a display 18 may form or be part of the display correction system 12. The ride vehicle 14 may include a motion base (e.g., a Stewart platform or an active support with one or more degrees of freedom) that generates movement to create a thrilling or immersive experience for a number of guests 20. In an embodiment, multiple ride vehicles 14 may be coupled (e.g., by one or more linkages) or included on a ride path 22 to travel along or about the ride path 22. In the illustrated embodiment, the ride path 22 is a two-rail track. However, the illustrated ride path 22 may be representative of various different types of ride paths 22 (e.g., a single rail, an overhead rail, flooring, or grooves).

The ride path 22 may or may not dictate the path traveled by the ride vehicle 14. That is, in an embodiment, the ride path 22 may control the movement (e.g., direction, speed, and/or orientation) of the ride vehicle 14 as it progresses, similar to a train on train tracks. In another embodiment, there may be a system for controlling the path taken by the ride vehicle 14. The ride vehicle 14 may travel along the ride path 22 at programmed speeds and/or programmed positions (e.g., locations, orientations) relative to the display 18. In an embodiment, the ride path 22 may be an open surface that allows the guests 20 to control certain aspects of the movement of the ride vehicle 14 via a control system resident on the ride vehicle 14. Moreover, in an embodiment, the ride vehicle 14 may be rotated in any suitable orientation within the attraction 10. For example, the ride vehicle 14 may be rotated to position the guests 20 facing the display. As another example, the ride vehicle 14 may be rotated to orient the guests 20 toward the rail path 22, while the display 18 is positioned on the right and/or left side of the ride vehicle 14.

The ride vehicle 14 may accommodate the guests 20 (e.g., passengers) in a number of guest configurations (e.g., distributions, arrangements). Indeed, the guest configurations may be associated with the number of guests 20 and/or a location (e.g., position) of each guest of the guests 20 in the ride vehicle 14. For example, the illustrated embodiment shows one ride vehicle 14 that accommodates twelve guests 20 (e.g., in twelve seats or other suitable guest spaces in a guest area). In another embodiment, the attraction 10 may include any number of ride vehicles 14 that each accommodate any number of guests 20. Additionally, each of the ride vehicles 14 may include any number of rows with any suitable number of seats in each row. For example, the illustrated embodiment shows the ride vehicle 14 with a first row, a second row, and a third row, with four seats in each row. However, the ride vehicle 14 may include five, eight, ten, or any number of rows with any number of seats or other suitable guest spaces in a guest area. For example, the first row may include six seats, the second row may include eight seats, and the third row may include ten seats. As another example, a first row may include four seats, a second row may include five seats, and a third row may include six seats.

It should be noted that although generation and application of the color correction layer by the display correction system 12 is described with respect to the ride vehicle 14, the display correction system 12 may be employed in any suitable environment. That is, the display correction system 12 may be employed in an environment that includes a number of seats positioned relative to any suitable display. For example, the display correction system 12 may be employed in a theater (e.g., movie theater), a venue (e.g., concert, sporting event), a gaming center, an exhibit, a restaurant, and so on.

The ride vehicle 14 may include one or more sensors 24 to monitor a position of the ride vehicle 14, movement of the ride vehicle 14, acceleration of the ride vehicle 14, an orientation of the ride vehicle 14, the number of guests 20 in the ride vehicle 14, and/or the location of each guest of the guests 20 in the ride vehicle 14, for example. Additionally or alternatively, the sensors 24 may be off-board the ride vehicle 14 (e.g., disposed in any suitable location within the attraction 10). In an embodiment, the sensors 24 may monitor and/or identify the color drift of the display 18.

The sensors 24 may provide sensor data to the control system 16 for processing. For example, the sensor data may enable the control system 16 to determine the guest configurations of the ride vehicle 14. The sensors 24 may be communicatively coupled to the control system 16 by wired or wireless (e.g., Bluetooth, Wi-Fi, or any other suitable wireless connection) connections. The one or more sensors 24 may include any number of force sensors, contact sensors, acceleration sensors, motion sensors, image sensors, position sensors, and/or any other suitable sensor. For example, each seat of the ride vehicle 14 may include the contact sensor, which may detect when a guest 20 is seated in the seat based on a detected contact by the seated guest 20 with the contact sensor. As another example, the image sensor may capture images of the ride vehicle 14 and/or the display 18 and provide the image data to the control system 16 to enable analysis of the image data to determine the location of each guest 20 in the ride vehicle 14 and/or a color tone of the display 18.

The control system 16 may include one or more processors 26 (referred to herein as a single processor for convenience), a memory 28, and/or communications circuitry 30. The processor 26 may be any type of computer processor or microprocessor capable of executing computer-executable code. The processor 26 may also include multiple processors, processing circuitry, or a processing system that may perform the operations described herein. For example, the processor 26 may receive sensor data from the one or more sensors 24 and determine the guest configuration based on the sensor data.

The memory 28 may include a volatile memory, such as random-access memory (RAM), and/or a nonvolatile memory (ROM). The memory 28 may store a variety of information and may be used for various purposes, such as a pre-determined program for the ride vehicle 14, color correction layers, and so on. The memory 28 may store processor-executable instructions, such as instructions for generating the color correction layers. The memory 28 may also include flash memory, or any suitable optical, magnetic, or solid-state storage medium, or a combination thereof. The memory 28 may store data, instructions (e.g., software or firmware for generating and/or applying the color correction layer), and any other suitable information.

The communications circuitry 30 may be a wireless communication component that may facilitate communication between the control system 16, the ride vehicle 14, the display 18, and/or various other computing systems via a network. The communications circuitry 30 may include antennas, transceiver circuits, and signal processing hardware and/or software (e.g., hardware or software filters, A/D converters, multiplexers amplifiers), or a combination thereof, that may be configured to communicate over wireless communication paths via Infrared (IR) wireless communication, satellite communication, broadcast radio, Microwave radio, Bluetooth, Zigbee, Wi-fi, UHF, NFC, etc. In some embodiments, the control system 16 may communicate with the ride vehicle 14 and/or the display 18 via a wired connection.

The display 18 may include any suitable display (e.g., liquid crystal display (LCD), light emitting diode (LED) display, LED panel, organic light emitting diode (OLED) display, micro-LED, transparent LCD display) that receives image data and projects (e.g., displays, transmits) the image data as imagery. The display 18 may be a flat display (e.g., straight screen surface) or a curved display (e.g., curved inward screen). In an embodiment, the display 18 may be a large display, which may include a larger screen size compared to a standard display, such as greater than 20, 30, 40, 50, or more meters measured on a diagonal across the display 18. For example, the display 18 may be large such that the ride vehicle 14 may be used to traverse from one side of the display 18 to the other side of the display 18. It should be noted that although a single display 18 is depicted in FIG. 1, any suitable number of displays may be included with the display correction system 12. Thus, the display correction system 12 may generate and apply any number of color correction layers for each of the displays.

In an embodiment, the display 18 may be coupled to a number of movement mechanisms that may enable the display 18 to transition (e.g., travel) up, down, forward, back, left, and/or right in a three-dimensional space. Indeed, the control system 16 may operate to cause the movement mechanisms to move the display 18. For example, the movement mechanisms may include motorized mechanisms, such as a motorized platform and/or rail that may move the display 18 in any suitable direction. Therefore, the control system 16 may activate (e.g., the motors) and/or instruct movement of the motorized mechanisms to cause the display 18 to move. As another example, the movement mechanisms may include robotic components (e.g., robotic arm, robotic body), and the display 18 may be coupled to the robotic components. It should be noted that the examples described herein are illustrative and any other suitable movement mechanism that may enable movement of the display 18 may be used.

At times, the display 18 may be the large display that involves use of the ride vehicle 14 to traverse from one end of the display 18 to the other end of the display 18. As the ride vehicle 14 traverses, the display 18 may exhibit changes in color balance, with some colors becoming more dominant or faded compared to others. Indeed, as the guests 20 travel in the ride vehicle 14 from a first side (e.g., a left side) of the display 18 to a second side (e.g., a right side) of the display 18, the guests 20 may visually perceive the image presented on the display 18 as greener on the first side and redder on the second side. That is, the first side of the display 18 may exhibit a red tone in comparison to the rest of the display 18 and the second side of the display 18 may exhibit a green tone in comparison to the rest of the display 18. As such, it may be beneficial to generate color correction layers to apply to the display 18 to correct color imbalance, such as the red tone and the green tone.

In operation, the ride vehicle 14 may travel along the ride path 22 based on a pre-determined program. For example, the control system 16 may be pre-programmed to control various aspects (e.g., parameters) of the ride vehicle 14 during a ride cycle, such as a speed, position (e.g., relative to the display 18), acceleration, deceleration, stops, orientation, timing, sequencing, and so on. Moreover, the control system 16 (e.g., the processor 26 of the control system 16) may instruct (e.g., cause) the ride vehicle 14 to travel along the ride path 22 relative to the display 18. That is, as the ride vehicle 14 moves along the ride path 22, the ride vehicle 14 may pass by or interact with the display 18. As the ride vehicle 14 passes by or interacts with the display 18, the control system 16 may cause the display 18 to display media (e.g., images, videos) that may be synchronized with the ride vehicle 14.

The control system 16 may identify points (e.g., particular areas along the ride path 22) during the ride cycle where the color drift of the display 18 may appear from a perspective of the guests 20. For example, the control system 16 may run a predictive modeling software to predict when and where the distortion may occur based on a motion of the ride vehicle 14 and a line of sight between the guests 20 and the display 18. As another example, the control system 16 may run a guest perspective simulation to determine how angles and speeds of the ride vehicle 14 may affect the perspective of the guest 20 in different seats of the ride vehicle 14 and at various points in the ride cycle. In an embodiment, the points during the ride cycle at which the color distortion may occur may be manually provided to the control system 16 via a user input. The control system 16 may apply the color correction layer during the points the color distortion may occur. The color correction layer may enable an adjustment of an intensity (e.g., a color value) of a color channel (e.g., the RGB channels) for each pixel (e.g., RGB LEDs) of the display 18 when applied to the display 18. That is, the control system 16 may adjust an amount of red, blue, and/or green light emitted or displayed by each pixel to control an overall color output.

In an embodiment, the control system 16 may determine a standard central view point based on a full occupancy of the ride vehicle 14. For example, the standard central view point may be based on an average height of each guest of the guests 20 in the ride vehicle 14 at full occupancy (e.g., the first guest configuration). The control system 16 may generate and store, in the memory 28, a standard color correction layer based on the standard central view point. Further, the control system 16 may receive sensor data from the sensors 24 and determine the guests 20 are in the first guest configuration in the ride vehicle 14 based on the sensor data. Thus, the control system 16 may determine the ride vehicle 14 is fully occupied. That is, as illustrated in FIG. 1, the first guest configuration may include a guest 20 in each seat of each of the first row, the second row, and the third row. Therefore, the control system 16 may retrieve the stored standard color correction layer to apply to the display 18 during the ride cycle.

Figure 2:
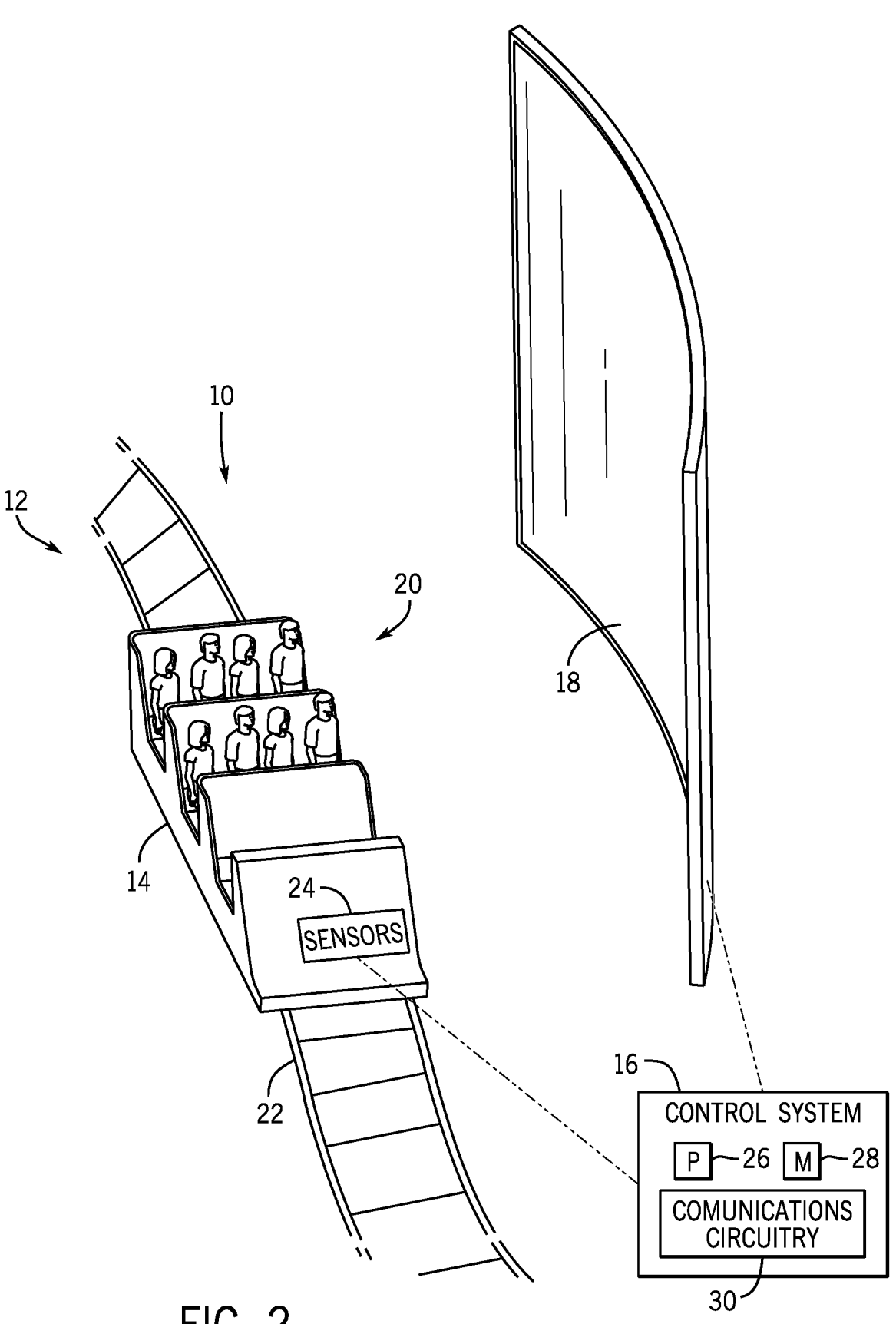
FIG. 2 is a perspective view of an attraction that includes the display correction system with the ride vehicle including a second guest configuration, in accordance with an embodiment of the present disclosure.

In an embodiment, the control system 16 may perform variable color correction based on varying occupancy of the ride vehicle 14. Indeed, the control system 16 may determine the ride vehicle 14 includes a different guest configuration (e.g., is not fully occupied) from the first guest configuration. For example, the control system 16 may receive the sensor data indicative of the ride vehicle 14 in a second guest configuration. Referring now to FIG. 2, in the second guest configuration, the ride vehicle 14 may include a guest 20 in each seat of the second row and third row, but may be empty in the first row.

The control system 16 may determine an adjusted central view point for the ride vehicle 14 based on the second guest configuration. For example, the control system 16 may average (or approximate) a visual perspective or sightline of each guest of the guests 20 in the ride vehicle 14 based on a height of each guest of the guests 20 to determine the central view point. As another example, the display correction system may approximate a view point from a center of the guests 20. Indeed, the center of the guests 20 in the second configuration may be at a point horizontally equidistant (e.g., exactly halfway) from the second row and the third row of the ride vehicle 14. Moreover, if the guests 20 in the second row and the third row are different heights, then the point may also be equidistant vertically from the heights of the guests 20.

The control system 16 may then generate an additional color correction layer based on the second guest configuration to apply to the ride cycle while the ride vehicle 14 is in the second guest configuration. Moreover, the control system 16 may store the additional color correction layer in the memory 28. In this manner, when the control system 16 receives the sensor data indicative of the second guest configuration in any subsequent ride cycles, the control system 16 may retrieve the additional color correction layer to apply to the display 18. It should be noted that the control system 16 may determine multiple adjusted central view points for any suitable number of guest configurations in the ride vehicle 14. For example, the control system 16 may determine the multiple adjusted central view points based on a right side of the ride vehicle 14 being occupied by the guests 20, a left side of the ride vehicle 14 being occupied by the guests 20, a single seat of the ride vehicle 14 being occupied by the guest 20, or any other suitable number of seats being occupied in any suitable location of the ride vehicle 14.

Additionally or alternatively, the control system 16 may determine a current central view point for the ride vehicle 14. For example, the current central view point may be based on measured or estimated heights of each guest of the guests 20 in the ride vehicle 14, such as via data from the sensors 24. As another example, the control system 16 may determine a gaze direction of one guest 20 or multiple guests 20, such as via data from the sensors 24, and determine the current central view point based on the gaze direction. The control system 16 may generate a current color correction layer based on the current central view point and apply the current color correction layer to the display 18. In this manner, the control system 16 may provide appropriate color correction based on the current central view point for the ride vehicle 14. Additionally or alternatively, the control system 16 may generate the current color correction layer based on changing (e.g., dynamic) parameters of the ride vehicle 14. For example, the control system 16 may account for the speed, position, orientation, acceleration, deceleration, and so on of the ride vehicle 14 when generating the current color correction layer. In an embodiment, the control system 16 may dynamically update the current color correction layer for application to the display 18 during the ride cycle based on the changing parameters of the ride vehicle 14.

Figure 3:
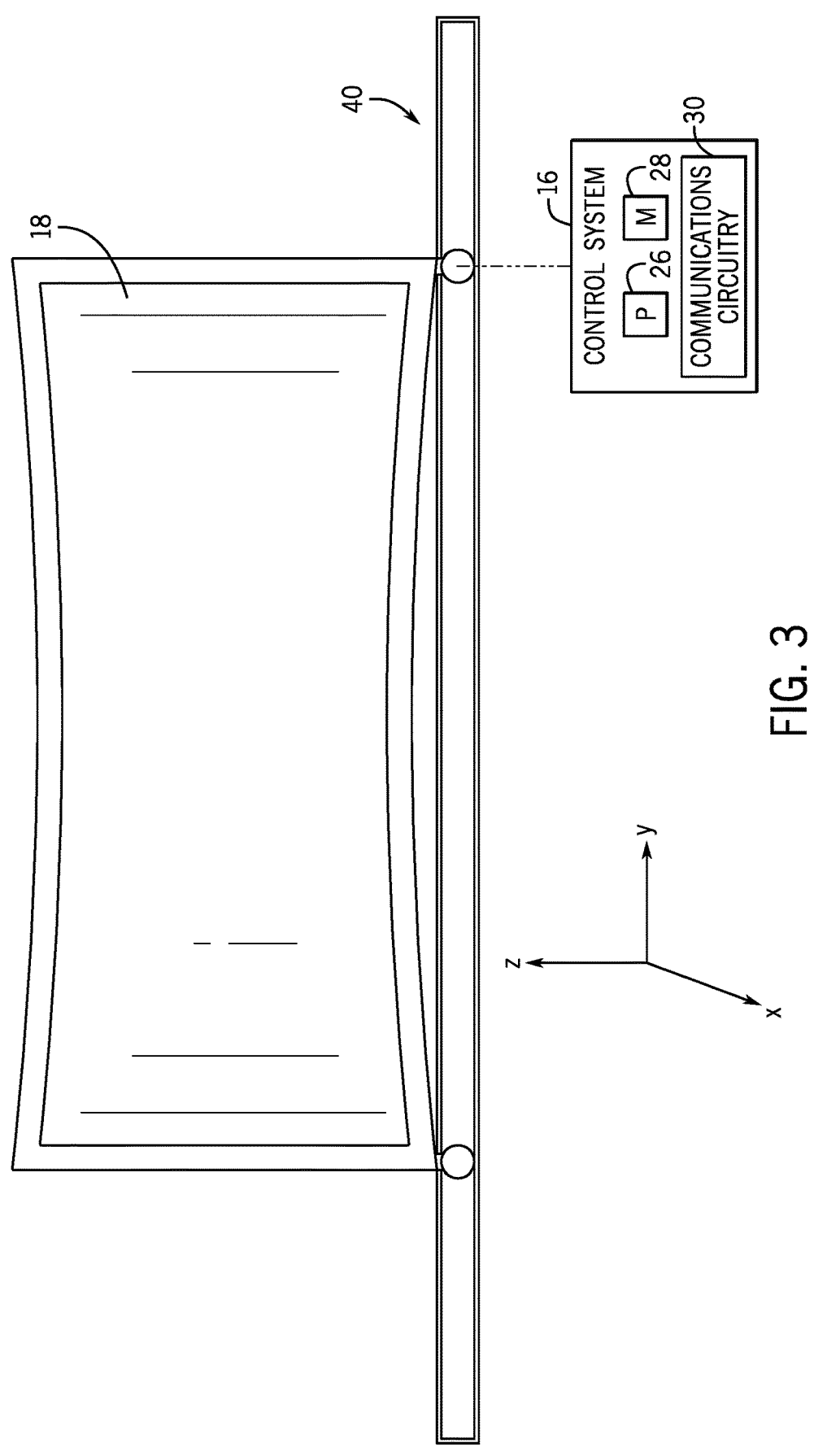
FIG. 3 is a schematic view of the display of the display correction system with movement mechanisms, wherein the display is movable, in accordance with an embodiment of the present disclosure.

At times, it may be beneficial to enable movement of the display 18. For example, the display 18 may move while the ride vehicle 14 and/or the guests 20 are stationary. As another example, the display 18, the ride vehicle 14, and/or the guests 20 may move in a simultaneous manner. With the foregoing in mind, FIG. 3 is a schematic view of the display 18 of the display correction system 12, which may be coupled to a number of movement mechanisms 40. For example, the movement mechanisms 40 may enable movement (e.g., adjustment) of the display 18 with respect to a three-dimensional coordinate system (e.g., an XYZ coordinate system). As another example, the display 18 may be adjusted to display media at different angles. It should be noted that the movement mechanisms 40 may include a single movement mechanism 40 or multiple movement mechanisms 40.

The control system 16 may instruct (e.g., cause) movement of the movement mechanisms 40. For example, the movement mechanisms 40 may include motorized mechanisms and the control system 16 may activate the motorized mechanisms to cause movement of the display 18. As the display 18 moves, the color drift of the display 18 may occur. As described herein, the control system 16 may identify points where the color drift of the display 18 may appear from the perspective of the guests 20. Therefore, the control system 16 of the display correction system 12 may generate the color correction layer based on the color drift that occurs from the movement of the display 18. Further, the control system 16 may apply the color correction layer to the display 18 at any suitable time during the movement and display of the media.

Figure 4:
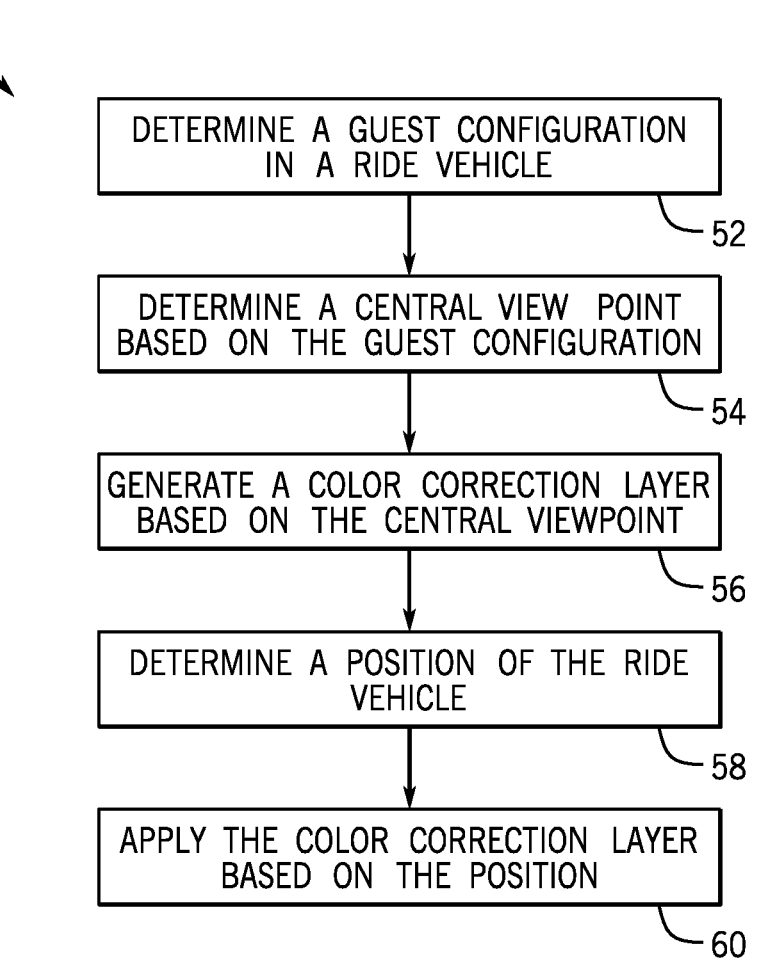
FIG. 4 is a flow diagram of a method for applying a color correction layer via the display correction system, in accordance with an embodiment of the present disclosure.

FIG. 4 is a flow diagram of a method 50 for applying a color correction layer via a display correction system. The method 50 disclosed herein includes various steps represented by blocks. It should be noted that at least some steps of the method 50 may be performed as an automated procedure by a system, such as the display correction system 12 of FIG. 1. Although the flow chart illustrates the steps in a certain sequence, it should be understood that the steps may be performed in any suitable order and certain steps may be carried out simultaneously, where appropriate.

In step 52, the method 50 may begin with determining a guest configuration in a ride vehicle. For example, a control system may receive sensor data indicative of a number of guests and/or a location of each guest of the guests in the ride vehicle and determine the guest configuration based on the sensor data. In step 54, a central view point may be determined based on the guest configuration. The central view point may be based on a distribution (e.g., arrangement) of the guests in the ride vehicle, an average sightline of each guest of the guests, an average height of each guest of the guests, and/or a center point between each guest of the guests.

In step 56, a color correction layer may be generated based on the central view point. The color correction layer may enable adjustment of an intensity of a color value (e.g., a red value, a blue value, a green value) for a pixel or a group of pixels of a display when applied to the display. For example, while observing the display, the guests may visually perceive a portion of the display having a heightened intensity of a green tone. Therefore, the color correction layer may enable a decrease of a green channel for each pixel in the portion of the display having the heightened intensity of the green tone when applied to the display.

In step 58, a position (e.g., location) of the ride vehicle may be determined. For example, the position of the ride vehicle traveling along a ride path relative to the display may be determined. In step 60, the color correction layer may be applied based on the position of the ride vehicle. Indeed, in an embodiment, particular areas (e.g., distinct sections) along a ride path (e.g., during a ride cycle) can be identified where the guests may perceive the color drift in the display.

Therefore, if the ride vehicle is in the position where the color drift is perceptible, then the color correction layer may be applied. Further, adjustment of the intensity of the color value for each pixel or the group of pixels of the display may be based on applying the color correction layer. It should be noted that a result of implementing the method 50 in a first ride cycle with a first guest configuration is generation of a corresponding first color correction layer. Additionally, the result of implementing the method 50 in a second ride cycle with a second guest configuration is generation of a corresponding second color correction layer. As such, the method 50 may be implemented for any number of ride cycles to generate any corresponding number of color correction layers.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. For example, while certain examples herein relate to color correction for a ride attraction and/or based on a configuration of guests in a ride vehicle, it should be appreciated that the techniques disclosed herein may be applied to other venues or environments, such as color correction for a restaurant and/or based on a configuration of guests in a dining room region of the restaurant. Indeed, the techniques disclosed herein may be applied to other venues or environments with one or more displays, particularly large or oversized displays, visible to one or more guests in a guest area and/or with seating and/or spaces for the one or more guests in a guest area.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A display correction system, comprising:
 a display; and
 a control system comprising processing circuitry and a memory, the memory storing instructions, that when executed by the processing circuitry, are configured to cause the processing circuitry to:
  determine a first guest configuration in a ride vehicle traveling along a ride path during a first ride cycle, wherein the first guest configuration comprises a first number of guests seated in a first number of ride vehicle seats and a respective location of each guest of the first number of guests in the first number of ride vehicle seats;
  determine a first central view point based on the first number of guests and the respective location of each guest of the first number of guests in the first number of ride vehicle seats;
  identify a section of the ride path associated with a color drift of at least a portion of the display;
  determine the ride vehicle is positioned in the section of the ride path; and
  in response to determining that the ride vehicle is positioned in the section of the ride path:

generate a first color correction layer based on the first central view point and the color drift; and
   apply the first color correction layer to the display to correct the color drift.

2. The display correction system of claim 1, wherein the instructions are configured to cause the processing circuitry to adjust one or more color values of one or more pixels of the display based on applying the first color correction layer.

3. The display correction system of claim 2, wherein the one or more color values comprise a red value, a green value, a blue value, or any combination thereof.

4. The display correction system of claim 1, wherein the display comprises a movement mechanism, and wherein the instructions are configured to instruct movement of the display by activating the movement mechanism.

5. The display correction system of claim 1, wherein the instructions are configured to cause the processing circuitry to receive sensor data from one or more sensors and determine the first guest configuration based on the sensor data.

6. The display correction system of claim 1, wherein the first central view point is based on a height of each guest of the first number of guests, a sight line of each guest of the first number of guests, or any combination thereof.

7. The display correction system of claim 1, wherein the instructions are configured to cause the processing circuitry to adjust the first color correction layer based on one or more parameters of the ride vehicle.

8. The display correction system of claim 7, wherein the one or more parameters comprise a speed of the ride vehicle, an orientation of the ride vehicle relative to the display, a size of the ride vehicle, an acceleration of the ride vehicle, or any combination thereof.

9. The display correction system of claim 1, wherein the instructions are configured to cause the processing circuitry to store the first color correction layer corresponding to the first guest configuration.

10. The display correction system of claim 9, wherein the instructions are configured to cause the processing circuitry to:
 determine a second guest configuration in the ride vehicle traveling along the ride path during a second ride cycle, wherein the second guest configuration comprises a second number of guests seated in a second number of ride vehicle seats and a respective location of each guest of the second number of guests in the second number of ride vehicle seats, wherein the second guest configuration is different than the first guest configuration;
 determine a second central view point based on the second number of guests and the respective location of each guest of the second number of guests in the second number of ride vehicle seats, wherein the second central view point is different than the first central view point;
 identify an additional section of the ride path associated with the color drift of at least the portion of the display from the second central view point of the second number of guests;
 determine the ride vehicle is positioned in the additional section of the ride path; and
 in response to determining that the ride vehicle is positioned in the additional section of the ride path:
  generate a second color correction layer based on the second central view point and the color drift; and
  apply the second color correction layer to the display to correct the color drift.

11. The display correction system of claim 10, wherein the instructions are configured to cause the processing circuitry to:

determine the first guest configuration in the ride vehicle during a third ride cycle;

retrieve the stored first color correction layer; and apply the first color correction layer to the display.

12. The display correction system of claim 1, wherein the display comprises a curved display.

13. The display correction system of claim 1, wherein the first central view point comprises a combined view point based on a respective visual perspective of each guest of the first number of guests.

14. The display correction system of claim 1, wherein the color drift is associated with a perceptible color drift from the first central view point of the first number of guests.

15. The display correction system of claim 1, wherein the instructions are configured to cause the processing circuitry to adjust the first color correction layer based on a speed of the ride vehicle along the section of the ride path.

16. A method of operating a display correction system, the method comprising:

determining, via a processing system, a plurality of guest configurations of a ride vehicle traveling along a ride path during a plurality of ride cycles, wherein each guest configuration of the plurality of guest configurations comprises a respective number of guests seated in a respective number of ride vehicle seats and a respective location of each guest of the respective number of guests in the respective number of ride vehicle seats;

determining, via the processing system, a plurality of central view points based on the respective number of guests and the respective location of each guest of the respective number of guests in the respective number of ride vehicle seats;

generating, via the processing system, a plurality of color correction layers that address a color drift that occurs over at least a portion of a display and that is viewable from a section of a ride path, wherein a respective color correction layer of the plurality of color correction layers corresponds to a respective central view point of the plurality of central view points;

determining, via the processing system, the ride vehicle is positioned in the section of the ride path and has the respective central view point of the plurality of central view points; and in response to determining that the ride vehicle is positioned in the section of the ride path and has the respective central view point of the plurality of central view points, applying, via the processing system, the respective color correction layer to the display.

17. The method of claim 16, comprising storing, via the processing system, the plurality of color correction layers.

18. A display correction system, comprising:

a display; and a control system comprising processing circuitry and a memory, the memory storing instructions, that when executed by the processing circuitry, are configured to cause the processing circuitry to:

determine a guest configuration in a guest area comprising a path during a ride cycle, wherein the guest configuration comprises a number of guests in a number of guest spaces and a respective location of each guest of the number of guests in the number of guest spaces;

determine a central view point based on the number of guests and the respective location of each guest of the number of guests in the number of guest spaces;

instruct movement of the display relative to the guest area via one or more movement mechanisms;

identify a section of the guest area associated with a color drift of at least a portion of the display;

in response to determining that the central view point is in the section of the guest area:

generate a color correction layer based on the central view point and the movement of the display; and apply the color correction layer to the display.

19. The display correction system of claim 18, wherein the one or more movement mechanisms comprise a motorized platform, a motorized rail, one or more robotic components, or any combination thereof.

20. The display correction system of claim 19, wherein the instructions are configured to cause the processing circuitry to cause the movement of the display by activating the motorized platform, the motorized rail, or both.

\* \* \* \* \*